US012791793B2

(12) United States Patent
Davenport et al.

(10) Patent No.: US 12,791,793 B2
(45) Date of Patent: Nov. 10, 2026

(54) APPARATUS FOR GUIDING LIGHT FROM AN INPUT SIDE TO AN OUTPUT SIDE

(71) Applicant: Leibniz-Institut für Astrophysik Potsdam (AIP), Potsdam (DE)

(72) Inventors: John Davenport, Potsdam (DE); Kalaga Madhav, Potsdam (DE)

(73) Assignee: LEIBNIZ-INSTITUT FÜR ASTROPHYSIK POTSDAM (AIP), Potsdam (DE)

( * ) Notice: Subject to any disclaimer, the term of this patent is extended or adjusted under 35 U.S.C. 154(b) by 514 days.

(21) Appl. No.: 18/018,600

(22) PCT Filed: Jul. 30, 2021

(86) PCT No.: PCT/EP2021/071375

§ 371 (c)(1),
(2) Date: Jan. 30, 2023

(87) PCT Pub. No.: WO2022/023518

PCT Pub. Date: Feb. 3, 2022

(65) Prior Publication Data

US 2023/0305233 A1 Sep. 28, 2023

(30) Foreign Application Priority Data

Jul. 30, 2020 (EP) .................................... 20188489

(51) Int. Cl.
*G02B 6/26* (2006.01)
*G02B 6/028* (2006.01)

(52) U.S. Cl.
CPC ........... *G02B 6/262* (2013.01); *G02B 6/0288* (2013.01)

(58) Field of Classification Search
CPC .............................. G02B 6/262; G02B 6/0288
See application file for complete search history.

(56) References Cited

U.S. PATENT DOCUMENTS 7,272,956 B1 9/2007 Anikitchev et al.
2011/0094269 A1* 4/2011 Mukasa ............ G02B 6/02042 65/435

(Continued)

FOREIGN PATENT DOCUMENTS

| | | |
|---|---|---|
| CN | 110208907 A | 9/2019 |
| WO | 2011044618 A1 | 4/2011 |
| WO | 2017158331 A1 | 9/2017 |

OTHER PUBLICATIONS

T. A. Birks et. al., The photonic lantern, Advances in Optics and Photonics 7, 107-167 (2015).

(Continued)

*Primary Examiner* — Peter Radkowski
(74) *Attorney, Agent, or Firm* — McGlew and Tuttle, P.C.

(57) ABSTRACT

An apparatus (1) for guiding light and a method for producing a photonic lantern (2) are described. The apparatus (1) for guiding light from an input side (5) to an output side (6), comprises an input waveguide (3) at the input side (5) formed by at least two multi-mode fibres (7), an output waveguide (4) at the output side (7) formed by a single multi-mode fibre (5) and a photonic lantern (2) optically connecting the at least two multi-mode fibres (7) of the input waveguide to the single multi-mode fibre (8) of the output waveguide. The photonic lantern (2) is being designed such that, light transmitted by light guiding cores (9) of the at least two multi-mode fibres (7) of the input waveguide (3) is coupled into a light guiding core (10) of the single multi-mode fibre (8) of the output waveguide (4) and propagates through the light guiding core (10) of the single multi-mode fibre (8) of the output waveguide (4) and that claddings (11) surrounding the light guiding cores (9) of the at least two multi-mode fibres (7) of the input waveguide (3) are tapered down until they do at least almost not confine light.

20 Claims, 6 Drawing Sheets

(56) References Cited

U.S. PATENT DOCUMENTS

| | | | |
|---|---|---|---|
| 2017/0299900 A1 | 10/2017 | Montoya et al. | |
| 2020/0069165 A1* | 3/2020 | Thomson | A61B 1/00009 |

OTHER PUBLICATIONS

S. Yerolatsitis et. al., Adiabatically-tapered fibre mode multiplexers, Optics Express, vol. 22 (1), pp. 608-617, 2014.
H.-J. Yu et. al., Photonic lantern with multi-mode fibres embedded, RAA, vol. 14 (8), pp. 1046-1054, 2014.
R. L. Graham et. al., Dense packings of congruent circles in a circle, Discrete Mathematics 181, pp. 139-154, 1998.
Hiroshi Kakiuchida, Noriaki Shimodaira, Edson H. Sekiya, Kazuya Saito, and Akira J. Ikushima, "Refractive index and density in F- and Cl-doped silica glasses"; Applied Physics Letters 86, 161907 (2005); doi: 10.1063/1.1897062.

* cited by examiner

APPARATUS FOR GUIDING LIGHT FROM AN INPUT SIDE TO AN OUTPUT SIDE

CROSS REFERENCE TO RELATED APPLICATIONS

This application is the U.S. national stage of International Application No. PCT/EP2021/071375, filed on 2021 Jul. 30. The international application claims the priority of EP 20188489.7 filed on 2020 Jul. 30; all applications are incorporated by reference herein in their entirety.

BACKGROUND

The present invention relates to an apparatus for guiding light from an input side to an output and, comprising an input fibre at the input side formed by at least two multi-mode fibres, an output fibre at the output side formed by a single multi-mode fibre and a photonic lantern optically connecting the at least two multi-mode fibres of the input fibre to the single multi-mode fibre of the output fibre.

Optical waveguides as well as beam combiners and beam splitters comprising several optical waveguides are well-known components used in astronomy, physical or analytical chemistry and in the field of medicine and telecommunication. Common types of optical waveguides contain optical fibres, which are typically in circular cross-section, and consisting of dielectric material surrounded by another dielectric material with a lower refractive index. Optical fibres are most commonly made from silica glass. However, other glass materials are used for certain applications, and plastic optical fibres can be used for short distance applications.

Usually, optical fibres include a core surrounded by transparent cladding material with a lower index of refraction. Light is kept in the core by the phenomenon of total internal reflection, which causes the fibre to act as a waveguide. Fibres that support many propagation paths or transverse modes are called multi-mode fibres, whereas those that support a single mode are called single mode fibres. Multi-mode fibres generally have a wider core diameter and are used for short distance communication links and for applications where high power must be transmitted. Single-mode fibres are used, e.g. for most communication links longer than 1000 m.

Given the increasing role of data transmission not only light waveguides but also fibre-optic splitters and couplers allowing high data transfer rates to play an increasingly significant role in many of today's optical network topologies. Thus, improving the efficiency of light transmission, especially of fibre-optic splitters and couplers, will help to maximize the functionality of optical network circuits.

In general, bifurcated fibres where two or more multi-mode fibres are connected to rise separately at input sides, and placed next to each other within the same connector, as bundles, or as a ribbon, at the output exist. The disadvantages of this technical solution are, that there is little or no coupling between cores, output light distribution is significantly dependent on input, and the minimum output radius is set by collected fibres laid next to each other.

Traditional single-mode to multi-mode photonic lantern, as described in "T. A. Birks et. al., The photonic lantern, Advances in Optics and Photonics 7, 107-167 (2015)" solve this issue. A photonic lantern is an optical component made by adiabatically merging several single-mode fibres into one multi-mode fibre. Photonic lanterns provide low-loss interfaces between single-mode and multi-mode systems, where the precise optical mapping between cores and individual modes is unimportant. Here, light at the multi-mode end does mix across the multi-mode core, but cannot couple multi-mode output to two multi-mode input, as fibre cores would remain large enough to efficiently couple light after tapering, and so light would not couple between cores.

In addition, Fused Biconical Taper (FBT) splitters are fibre devices which couple light between two or more fibres by tapering a section to allow light to couple between cores. Irrespective of fibres in use it is necessary to match the numbers of input and output fibres or cut off and crush excess fibres to achieve unmatched numbers and so the efficiency is limited. Therefore, typically only fibre numbers up to 8 are realized.

In addition to spatial beam couplers or splitters Planar Lightwave Circuits (PLC) splitters are known. These splitters are based on the planar waveguide technology and provide a comparatively low-cost light distribution solution with small form factor and high reliability. These splitters use a slab waveguide onto which a splitting structure is inscribed. In case a more capable light distribution is needed, these splitters are typically more complex and expensive to manufacture than tapered fibre devices, cannot produce three-dimensional arrangements and do not have as wide array of materials and refractive indices available to them as optical fibres. Furthermore, losses are comparatively high, and thus limiting the efficiency and the throughput, which is essential in applications such as astronomy, and medicine.

In "S. Yerolatsitis et. al., Adiabatically-tapered fibre mode multiplexers, Optics Express, Vol. 22 (1), pp. 608-617, 2014" simple all-fibre three-mode multiplexers are disclosed, which are made by adiabatically merging three dissimilar single-mode cores into one multi-mode core. This is achieved by collapsing air holes in a photonic crystal fibre and by fusing and tempering separate telecom fibres in the fluorine-doped silica capillary. In each case the $LP_{01}$ and both $LP_{11}$ modes are excited from three separate input cores with losses below 0.3 and 0.7 dB respectively and mode purities exceeding 10 dB.

Furthermore, "H.-J. Yu et. al., Photonic lantern with multi-mode fibres embedded, RAA, Vol 14 (8), pp. 1046-1054, 2014" describes a multi-mode to multi-mode photonic lantern, which is made by chemically dripping polymer claddings from seven multi-mode fibres before stacking and tapering them inside a silica capillary, which results in a bundle of several multimode-fibres with claddings being not in order.

The instant invention is directed to the problem of how to overcome some or all of the problems known from the prior art. Compared to conventional solutions a comparatively efficient coupling of light between several multi-mode fibres and one single multi-mode fibre should be obtained. Therefore, one objective of the invention is to provide an apparatus and a method which allow light from multiple sources to be combined into a single fibre such as from optical telescopes, or divided from a single source to many locations such as the manufacturing cutting laser. Here, an efficient coupling of light should be obtained, and losses should be minimized.

With the help of the invention, an efficient coupling between cores of multi-mode fibres as well a light distribution which is significantly independent on input should be realized. In addition, the minimum output radius should not be determined by collected fibres laid next to each other. Furthermore, a connection between several multi-mode fibres and one single multimode fibre with a high throughput should be enabled, in such a way that the new optical coupler and/or splitter is suitable for different applications in the fields of astronomy, medicine, and/or cutting production.

SUMMARY

An apparatus (1) for guiding light and a method for producing a photonic lantern (2) are described. The apparatus (1) for guiding light from an input side (5) to an output side (6), comprises an input waveguide (3) at the input side (5) formed by at least two multi-mode fibres (7), an output waveguide (4) at the output side (7) formed by a single multi-mode fibre (5) and a photonic lantern (2) optically connecting the at least two multi-mode fibres (7) of the input waveguide to the single multi-mode fibre (8) of the output waveguide. The photonic lantern (2) is being designed such that, light transmitted by light guiding cores (9) of the at least two multi-mode fibres (7) of the input waveguide (3) is coupled into a light guiding core (10) of the single multi-mode fibre (8) of the output waveguide (4) and propagates through the light guiding core (10) of the single multi-mode fibre (8) of the output waveguide (4) and that claddings (11) surrounding the light guiding cores (9) of the at least two multi-mode fibres (7) of the input waveguide (3) are tapered down until they do at least almost not confine light.

DETAILED DESCRIPTION

The objectives mentioned above are met with an apparatus according to claim 1 as well as with a method according to claim 12, Furthermore, claim 15 contains and specific use of an apparatus according to the invention. Preferred embodiments are disclosed in the dependent claims and will be explained in detail in the following description. Additionally, certain specific embodiments of the invention are explained with the help of drawings.

The invention is based on an apparatus for guiding light from an input side to an output side, comprising an input waveguide at the input side formed by at least two multi-mode fibres, an output waveguide at the output side formed by a single multi-mode fibre and a photonic lantern optically connecting the at least two multi-mode fibres of the input waveguide to the single multi-mode fibre of the output waveguide. According to the invention the photonic lantern is being designed such that, light transmitted by light guiding cores of the at least two multi-mode fibres of the input waveguide is coupled into a light guiding core of the single multi-mode fibre of the output waveguide and propagates through the light guiding core of the single multi-mode fibre of the output waveguide and that claddings surrounding the light guiding cores of the at least two multi-mode fibres of the waveguide fibre are tapered down until they do at least almost not confine light. Only for the avoidance of doubt it is admitted that according to the invention light coupling can take place in either direction, combining light from at least two multi-mode fibres into one single multi-mode fibre, or splitting light from a single multi-mode fibre into at least two separate multi-mode fibres. Thus, the apparatus according to the invention can be used as beam combiner and/or as beam splitter, only by interchanging the input side and the output side in such a way that the output side becomes the input side and the input side becomes the output side.

Traditional photonic lanterns are formed by stacking multiple single-mode fibres inside a low refractive index capillary heating and drawing them to fuse them together. The claddings of the single-mode fibres become the cores of the new multi-mode fibre, and the capillary becomes the new cladding. Here, the cores of the single-mode fibres decrease in size during the draw process becoming too small to efficiently couple light. Since the considerably larger cores remain able to couple light, which will then not mix across the new core, this method is not possible with a photonic lantern connecting several multi-mode fibres with one single multi-mode fibre. In contrast, according to the invention multi-mode fibres at the input side are used with high core to cladding ratios for which, when tapered, the claddings of the at least two multi-mode fibres of the input waveguide become too thin to effectively confine light. Therefore, this allows light to couple across the new core region of the one multi-mode fibre of the output waveguide delivering approximately multi-mode behaviour. Simulations, which will be shown below already have demonstrate, that the efficiency of the light coupling between multiple multi-mode fibres at the input to one single multi-mode fibre at the output is no less than about 80%.

According to a preferred embodiment of the invention the at least two multi-mode fibres located at the input side are arranged inside a capillary. Advantageously, the capillary of the input waveguide comprising at least two multi-mode fibres becomes the new cladding, the cores of to the multi-mode fibres arranged at the input side become the core of the single multi-mode fibre at the output side and the original thin claddings of the at least two multi-mode fibres at the input side are tapered down until they do no longer efficiently confine light. This transition from at least two multi-mode fibres into one single multi-mode fibre takes place in the photonic lantern connecting the input side and the output side of an apparatus according to the invention.

Furthermore, it is it is advantageous that the capillary forms also the cladding of the single multi-mode fibre of the output waveguide. According to this technical solution the capillary becomes the new cladding of the single multi-mode fibre at the output having a comparatively large diameter.

In a further preferred embodiment, the capillary, and/or a core of at least one multi-mode fibre on the input side and/or the core of the single multi-mode fibre on the output side comprises fluorine doped silica glass. The advantage of this material is, that it lowers the refractive index, which is useful for cladding material. By using fluorine doped capillaries, light guiding cores can be formed with either pure silica or higher refractive index materials.

Another reason for using optical fibre using fluorine doped silica glasses, so called modified fused silica, is that these fibres can be used for the deep ultraviolet light.

Optimizing the fibre drawing conditions improve the transmission of the fibre in the deep UV-region. Here, the transmittance of the fibre at 193 nm reach more than 65% per 1 m long without reflection loss. Significant absorption bands from defects are not observed throughout the wavelength of the deep UV- to visible to infrared light. Furthermore, hydrogen-impregnation into the fibre suppressed the gradation of the transmission and use the irritating with an ArF-excimer laser. With the help of this technical solution, transmission in the deep ultraviolet region and resistance to laser irradiation are advantageously improved compared to silica fibres with a high OH-ratio. Favourably, the cladding and/or at least one of the multi-mode fibres in use is dipped into hydrofluoric acid solution as to prepare fibres with a sharp-pointed edge.

In another preferred embodiment of the invention the at least two multi-mode fibre at the input side are arranged in a close packed arrangement in relation to a cross-sectional plane of the input waveguide. With respect to the close packed arrangement, different arrangements are suitable, where the inside diameter of the input waveguide is efficiently used to pack at least two multi-mode fibres. According to this preferred solution, it is preferred to realize a dense packing of several multi-mode fibres with a circular cross-section in a capillary with an inside circular cross-section. Advantageously algorithm known from "R. L. Graham et. al., Dense packings of congruent circles in a circle, Discrete Mathematics 181, pp. 139-154, 1998" are used to determine the most efficient close packed arrangement.

In another specific embodiment of the invention several multi-mode fibres of the input waveguide are stacked together in a hexagonal packing. Particularly advantageous is an input waveguide comprising 58 to 62, particularly 61 individual multi-mode fibres, each with a core diameter of 22 to 24, particularly 23 μm and a core to cladding ratio between 1.05 and 1.15, preferably of 1.1.

Preferably the at least one of several multi-mode fibres, starting from the input side, is tapered down to a core diameter between 1.0 and 1.10 μm, especially to 1.05 μm.

Furthermore, in a preferred embodiment at the input and/or at the output side multi-mode fibres are used, which have cores of pure silica.

Besides this, it is conceivable that the refractive index of the light guiding core of at least one multi-mode fibre of the input waveguide and/or the refractive index of the single multi-mode fibre of the output waveguide is between 1.440 and 1.448, preferably 1.444 at a wavelength within a range of 1450 to 1650 nm, in particular at a wavelength of approximately or accurately 1550 nm. Furthermore, it is preferred that the refractive index of the capillary of the input waveguide surrounding at least two multi-mode fibres and/or the single multi-mode fibre of the output waveguide is between 1.425 and 1.430, preferably 1.428 at a wavelength within a range of 1450 to 1650 nm, in particular at a wavelength of approximately or accurately 1550 nm.

In General it is conceivable, that for light or radiation with a wavelength in a range of 700 to 1600 nm the refractive index of the core of at least one multi-mode fibre of the input waveguide and/or the refractive index of the core of the single multi-mode fibre of the output waveguide is 1.4553 to 1.4434, the refractive index of the cladding of at least one multi-mode fibre of the input waveguide and/or the refractive index of the cladding of the single multi-mode fibre of the output waveguide is 1.450 to 1.440 and/or the refractive index of the capillary of at least one multi-mode fibre of the input waveguide and/or the refractive index of the capillary of the single multi-mode fibre of the output waveguide is 1.449 to 1.438. Here, the cladding and capillary values can be estimated based on the "Hiroshi Kakiuchida, Noriaki Shimodaira, Edson H. Sekiya, Kazuya Saito, and Akira J. Ikushima, "Refractive index and density in F- and Cl-doped silica glasses"; Applied Physics Letters 86, 161907 (2005); doi: 10.1063/1.1897062".

In addition, the invention relates to a method for producing a photonic lantern suitable for an apparatus for guiding light from an input side to an output side comprising the steps of providing at least two multi-mode fibres comprising a light guiding core and a cladding surrounding the light guiding core, stacking the at least two multi-mode fibres inside a capillary, heating and drawing the capillary together with the multi-mode fibres in such a way, (a) that the light guiding cores of the at least two multi-mode fibres become a light guiding core of a single multi-mode fibre, at which the capillary building the cladding of said single mode fibre and (b) that claddings surrounding the light guiding cores of the at least two multi-mode fibres of the input waveguide, when stacked inside the capillary are tapered down until they do at least almost not confine light.

For the avoidance of doubt it is admitted again, that according to the invention light coupling can take place in either direction, combining light from at least two multi-mode fibres into one single multi-mode fibre, or splitting light from a single multi-mode fibre into at least two separate multi-mode fibres. Thus, the method according to the invention allows producing a photonic lantern, which can be used as beam combiner and/or as beam splitter, only by interchanging the input side and the output side in such a way that the output side becomes the input side and the input side becomes the output side.

According to this inventive method the capillary of the input waveguide becomes the cladding of the output waveguide, respectively of the single multi-mode fibre at the output side, the cores of the initial multi-mode fibres of the input waveguide become the core of the single multi-mode fibre of the output waveguide, whereat claddings of the at least two multi-mode fibres extending from the input side are tapered down until they no longer efficiently confine light. Preferably, the at least two multi-mode fibres comprising a light guiding core and a cladding surrounding the light guiding core are stacked together in a close packed arrangement inside the capillary. Again, different arrangements of multi-mode fibres guiding light are suitable, whereby the cross-sectional plane inside the capillary comprising multiple multi-mode fibres is used efficiently.

According to one preferred embodiment of the invention, the multiple multi-mode fibres are stacked together in a hexagonal packing and tapered down to core diameter between 1.00 and 1.10, particularly of 1.05.

Another preferred embodiment of the invention is characterized in that the diameter of the light guiding cores of the at least two multi-mode fibres of the input waveguide are tapered down in such a way, that a resulting diameter is between 4.5 and 4.6% of the diameter before tapering.

Another aspect of the invention described herein, is a specific use of an apparatus and/or a photonic lantern produced according to at least one embodiment described above.

According to the invention such an apparatus and/or photonic lantern is used for coupling light from multiple telescopes into a single spectrograph, for medical endoscopy, in particular for fluorescent sensors, for coupling light between excitation sources, and sensors, for medical surgery and/or for guiding light from multiple laser sources to a laser cutting tool or for dividing light from a cutting laser to multiple output points. Furthermore, the apparatus according to the invention and/or the photonic lantern produced by the inventive method can preferably be used for telecommunication and internet applications, particularly for multichannel bidirectional data transfer.

Again, the advantage of the invention is, that an efficient coupling between many separable multi-mode fibres and one single multi-mode fibre can be achieved. This allows light from multiple sources to be combined into a single multi-mode fibre such as from optical telescopes into a single spectrograph or splitting light from a single source to many locations, such as manufacturing cutting lasers of a production line.

Further features properties and advantages of the present invention will become clear from the following description of embodiments in conjunction with the accompanying drawings. The embodiments do not limit the scope of the present invention which is determined by the independent claims.

DETAILED DESCRIPTION OF THE PREFERRED EMBODIMENTS

Figure 1:
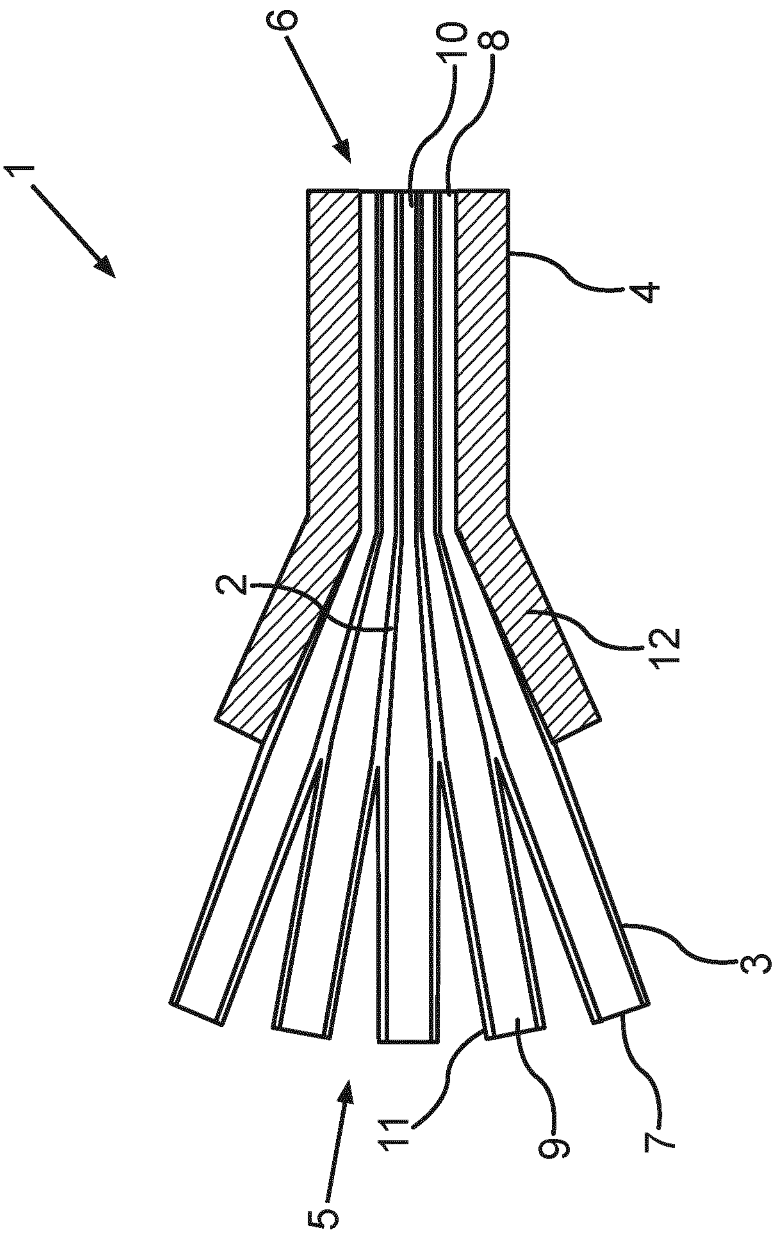
FIG. 1: Diagram of an apparatus according to the invention with multiple multi-mode fibres at the input side, a single multi-mode fibre at the output side, and a photonic lantern connecting the input and the output side, FIG. 2 Cross- and longitudinal-sectional view of a waveguide comprising several multi-mode fibres in a close packed arrangement.

FIG. 1 shows in a longitudinal cross-section a schematic diagram of an apparatus 1 according to the invention, which allows an efficient coupling of light between several multi-mode fibres 7 and one single multi-mode fibre 8. Here, the apparatus 1 comprises a specific photonic lantern 2 building a transition region and connecting the input waveguide 3 with multiple multi-mode fibres 7 with one single multi-mode fibre 8 of the output waveguide 4.

Traditionally, photonic lanterns are produced by stacking a bundle of single-mode fibres inside a capillary and tapering them down to fuse into a single multi-mode fibre. The capillary becomes the cladding of the single multi-mode fibre, the cladding of the single-mode fibres become the core of the multi-mode fibre, and the cores of the single-mode fibres are reduced to the point, that they can no longer efficiently couple light. Multi-mode fibres cannot be drawn into a photonic lantern in the traditional way as their significantly larger cores would still be able to couple light even after tapering. Consequently, light does not propagate across a single fibre and may lead to erroneous spectroscopic measurements.

According to the invention, an apparatus 1 comprising a photonic lantern 2 as well as a method of producing such a photonic lantern 2 are provided as to make it possible to couple light from many multi-mode fibres 7 to a single multi-mode fibre 8. This coupling of light is obtained by stacking and tapering several multi-mode fibres 7 with high core to cladding ratios such that claddings 11, when tapered, become too thin to efficiently confine light. Unlike with traditional designs, the core 10 of the single multi-mode fibre 8 is formed by fusing the cores 9 of the many multi-mode fibres 7 with the cladding formed from the capillary 12.

As shown in FIG. 1, on the input side 5 a waveguide 3 is formed by multiple multi-mode fibres 7 guiding light in the direction of the photonic lantern 2 connecting the input waveguide 3 and the output waveguide 4, which only comprises one single multi-mode fibre 8 with a core 10 having large core diameter. In addition, the capillary 12 of the input waveguide 3 surrounding the multiple multi-mode fibres 7 becomes the cladding of the output waveguide 4, respectively the one single multi-mode fibre 8.

Depending whether the photonic lantern 2 arranged in the transition region of the apparatus 1 shown in FIG. 1 is used as a beam combiner or splitter light is directed from the input waveguide 3 into the output waveguide 4 or from the output waveguide 4 into the input waveguide 3. If the photonic lantern 2 is used to combine light guided by different multi-mode fibres 7 into the input end on the input side 5, e.g. for coupling light from multiple telescopes into a single spectrograph, light guided by at least two multi-mode fibres 7 is combined by the photonic lantern 2, and then propagates through the core 10 of the single multi-mode fibre 8 with a large diameter. According to the invention and shown in FIG. 1 the claddings 11 of the several multi-mode fibres 7 become too thin to efficiently confine light and the original cladding of the input waveguide 3 formed by a capillary 12 becomes the cladding of the single multi-mode fibre 8 of the output waveguide 4. Thus, the core 10 of the single multi-mode fibre leaving the apparatus 1 at its output end on the side 6 is formed by fusing the cores 9 of multiple multi-mode fibres 7 entering the apparatus 1 on its input side 5. As already mentioned, light coupling can take place in either direction, combining light from many multi-mode fibres 7 into a single multi-mode fibre 8 or splitting light from a single multi-mode fibre 8 into multiple multi-mode fibres 7.

The apparatus 1 according to the invention and the photonic lantern 2 produced by the inventive method, as shown in FIG. 1 can be used preferably in the field of astrophysics, where light from multiple telescopes can be coupled into a single spectrograph.

Furthermore, this technical solution is advantageous for medical endoscopy and/or surgery and can also be used in the field of industrial manufacturing, particularly where light from a cutting laser is divided between multiple output points whilst maintaining sufficient power. Of course, the inventive technical solution is also suitable for telecommunication and Internet applications, especially for multichannel bidirectional data transfer.

Figure 2:
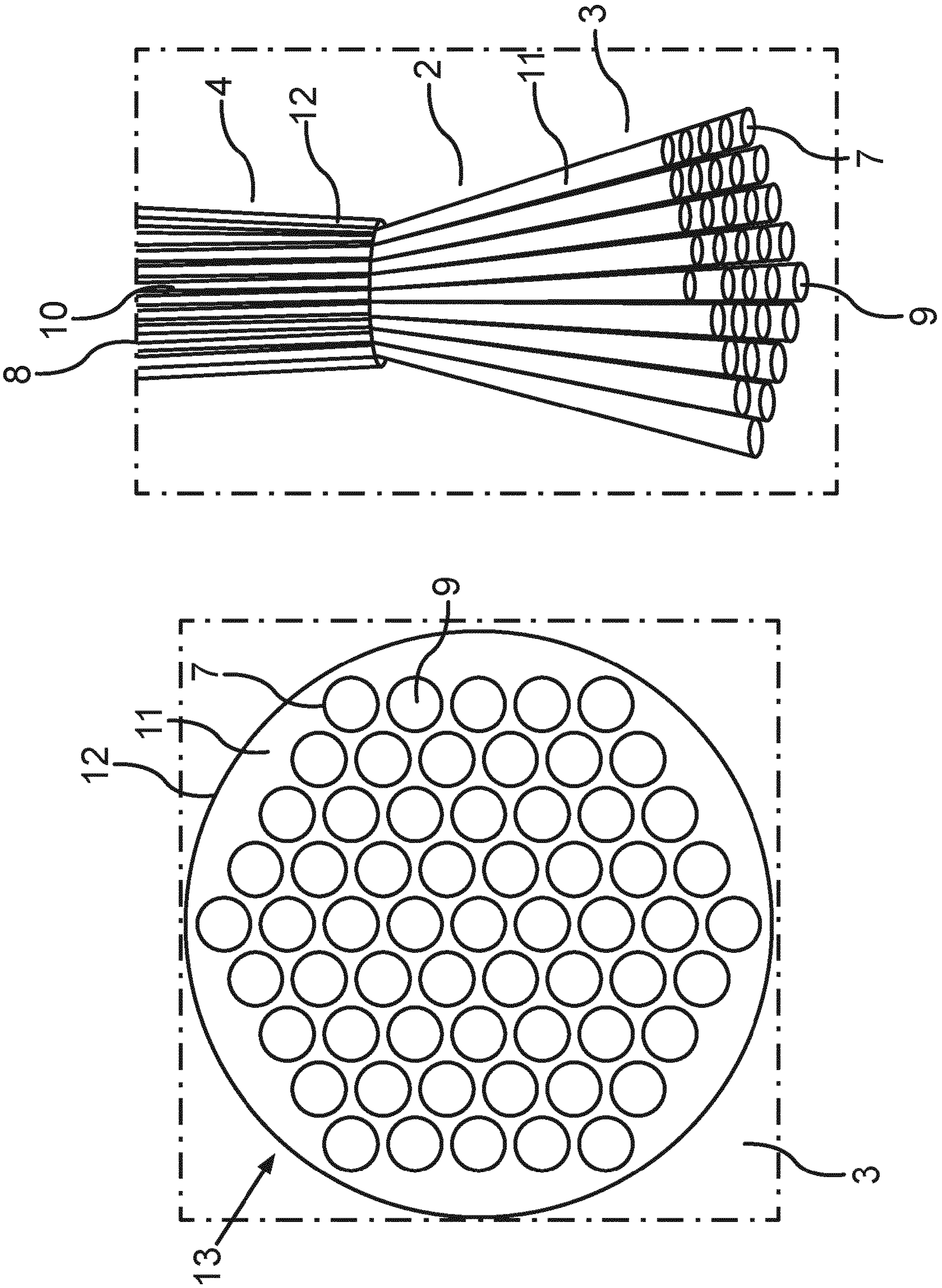

FIG. 2 shows in a cross-sectional view, cf. FIG. 2*a*, as well as in a longitudinal-sectional view, cf. FIG. 2*b*, of a photonic lantern 2 produced according to the invention. Multiple multi-mode fibres 7 are arranged in a closed packed arrangement 13. According to the specific embodiment shown in FIG. 2 a bundle of multi-mode fibres 7, each with a core diameter of 23 μm and core-to-cladding ration of 1:1.1, are stacked together in a hexagonal packing, whereat this packing is arranged inside a capillary 12 with an internal diameter of 219 μm, and a refractive index of 1.440533 at a wavelength of 1550 nm. The diameter of the cladding 11 of each multi-mode fibre 7 is about 25 μm, so that its thickness is about 1 μm.

The photonic lantern 2 shown in FIG. 2 was produced by pre-tapering larger multi-mode fibres 7 with high core-to-cladding rations.

According to this embodiment 61 multi-mode fibres 7 are used because of the number of desired telescopes as well as the current maximum optical fibre successfully drawn into a photonic lantern 2 as known from "D. Noordegraaf et. al., Multi-mode to single-mode conversion in a 61 port Photonic Lantern, Optics Express, 18(5), pp 4673-4678, 2010". Core and cladding diameters are chosen to ensure, that the claddings 11 of the several multi-mode fibres 7 become thin enough to allow multi-mode behaviour in the combined single multi-mode fibre 8.

The internal diameter of the capillary 12 selected to allow optimal packing arrangements 13 of the 61 multi-mode fibres 7 in the input waveguide 3. Here, algorithm known from "R. L. Graham et. al., Dense packings of congruent circles in a circle, Discrete Mathematics 181, pp. 139-154, 1998" are used to determine the most effective packing. The refractive index is selected to allow multi-mode behaviour in the fused section, respectively the single multi-mode fibre 8 with a numerical aperture of 0.1.

For the manufacturing, the stack is heated and tempered with a glass processing unit in such a way, that the fused single multi-mode fibre has a core diameter of approximately 80 μm, and a numerical aperture of 0.1.

Through the system shown in FIG. 2 light from 61 multi-mode fibres 7 can be combined into a single multi-mode fibre 8. For the intended application light from multiple telescopes pointed at the same astronomical object such as a star or galaxy, can be combined into a single multi-mode fibre 8 to be fed into a spectrograph. Thus, a more sensitive measurement can be taken. An alternative application combines light from multiple high-power lasers together into a single multi-mode fibre 8 for surgical or manufacturing uses.

The technical solution shown in FIG. 2 differs from prior art in that traditional photonic lanterns combine many single-mode fibres into one multi-mode fibre. Single-mode fibres, while having other advantages, are harder to launch light into. In contrast, multi-mode fibres inputs allow light to be more efficiently launched into them allowing more light to be combined into a single multi-mode fibre.

Figure 3:
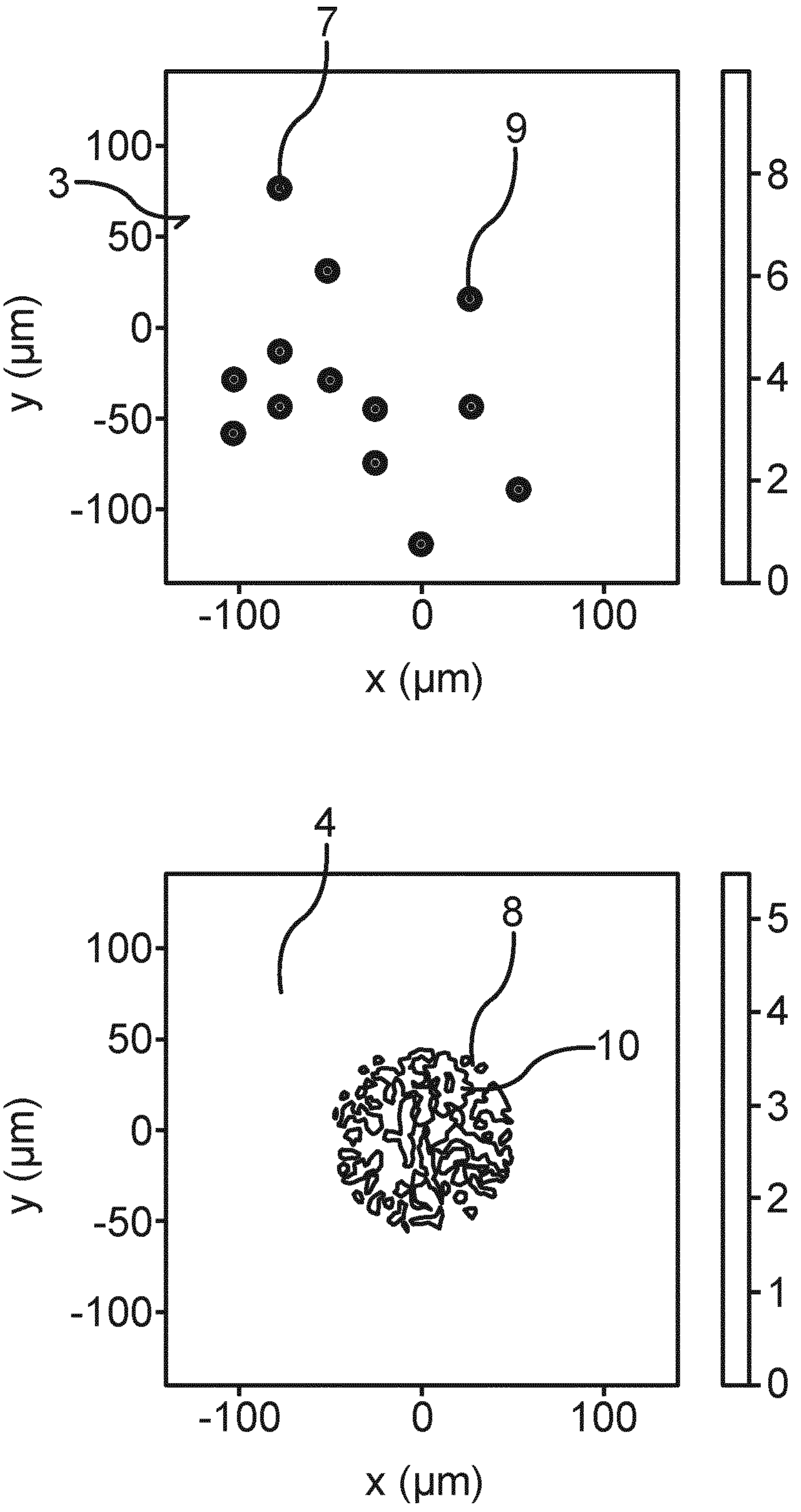
FIG. 3: Results of a first simulation with respect to the light distribution in the input and the output waveguide of an apparatus according to the invention, FIG. 4; Results of a second simulation with respect to the light distribution in the input and the output waveguide of an apparatus according to the invention.

FIG. 3 shows the results of a first simulation regarding the light coupling between multiple multi-mode fibres 7 and one single multi-mode fibre 8 being coupled with the help of an apparatus 1, respectively a photonic lantern 2 according to the invention. FIG. 3 a) shows in a cross-sectional view the light distribution in a bundle of several multi-mode fibres 7 of the input waveguide 3, whereat FIG. 3 b) shows, also in a cross-sectional, view the light distribution in the single multi-mode fibre 8 of the output waveguide 4, having a comparatively large core diameter.

It can be seen very clearly from FIG. 3 a) and b), that although light is guided into the photonic lantern 2 connecting the input and the output waveguide 3, 4 by several multi-mode fibres 7 being irregularly distributed within the input waveguide 3, the light distribution over the cross-section of the one single multi-mode fibre 8 is very uniform, as shown in FIG. 3 b). Furthermore, light losses caused by the light coupling are minimized.

Figure 4:
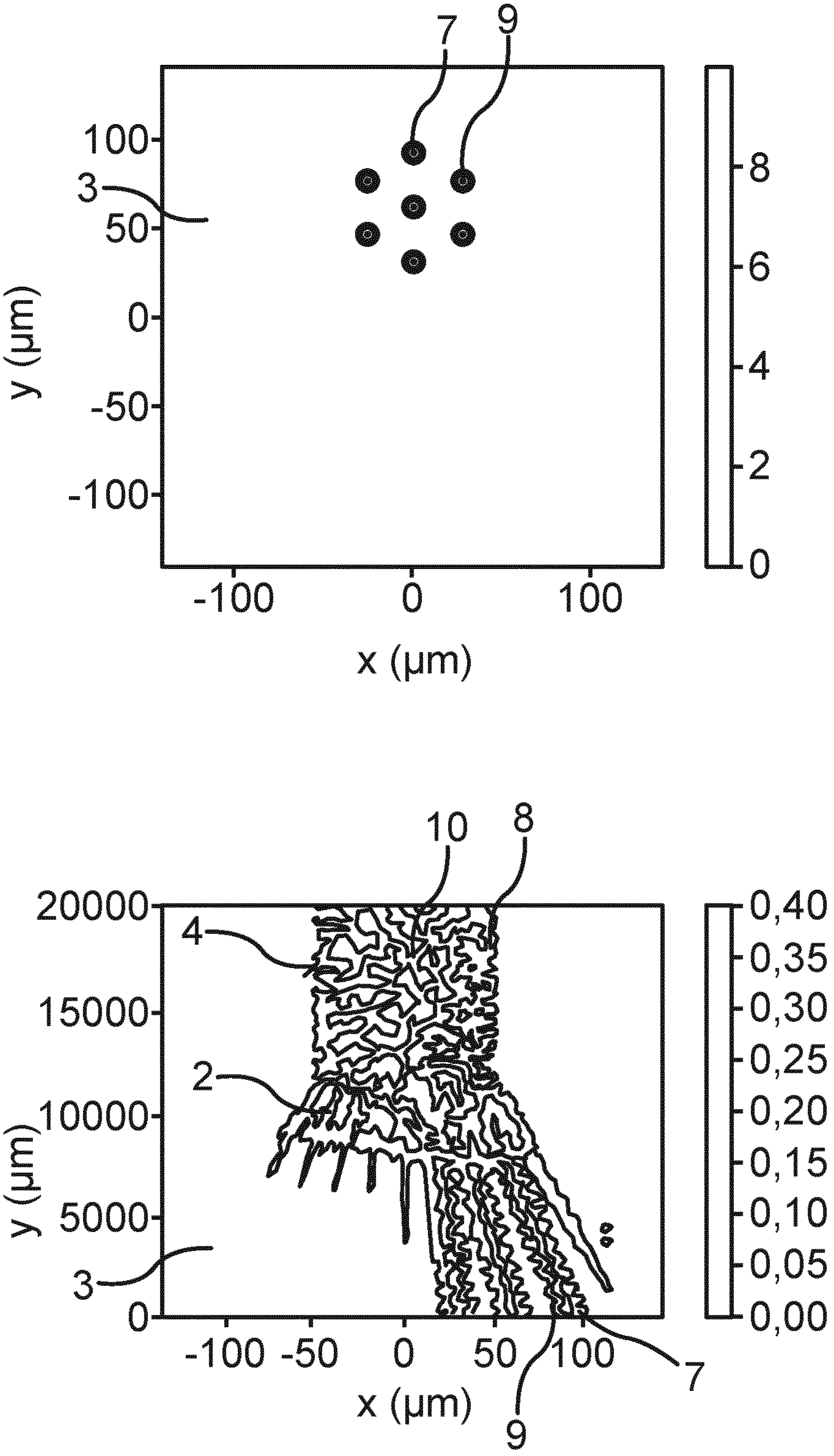

In addition, FIG. 4 shows the results of a second simulation. Here, seven multi-mode fibres 7 of the input waveguide 3 guiding light into the photonic lantern 2 are arranged in a hexagonal packing, as shown in FIG. 4 a). In contrast to FIG. 3 b) FIG. 4 b) shows the light distribution within the photonic lantern 2 in a longitudinal-sectional view. Again, the light distribution in the one single multi-mode fibre 8 of the output waveguide 4 is very uniform compared to the light distribution within the input waveguide 3 comprising seven separate multi-mode fibres 7.

Figure 5:
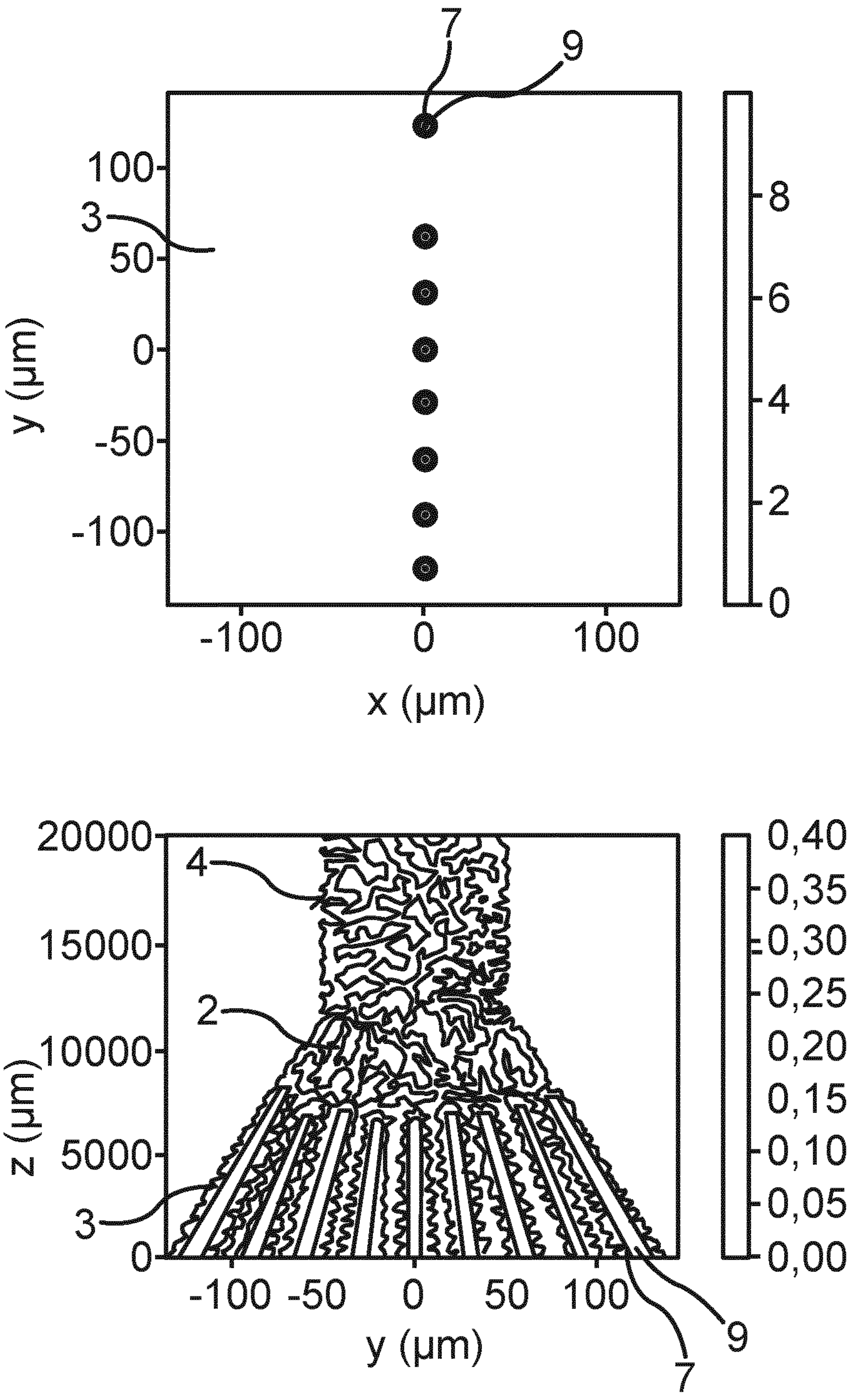
FIG. 5: Results of a third simulation with respect to the light distribution in the input and the output waveguide of an apparatus according to the invention.

According to a third simulation, whose results are shown in FIG. 5, the light guiding multi-mode fibres 7 of the input waveguide 3 are arranged in-line. The light distribution within the input waveguide 3 can be seen in FIG. 5 a). As a result, FIG. 5 b) clearly shows that the light distribution within the single multi-mode fibre 8 of the output waveguide 4 is very uniform again. The photonic lantern 2 connecting the input and the output waveguide 3, 4 combines the light propagating through the different multi-mode fibres 7 of the input waveguide 3 in a very efficient way.

Figure 6:
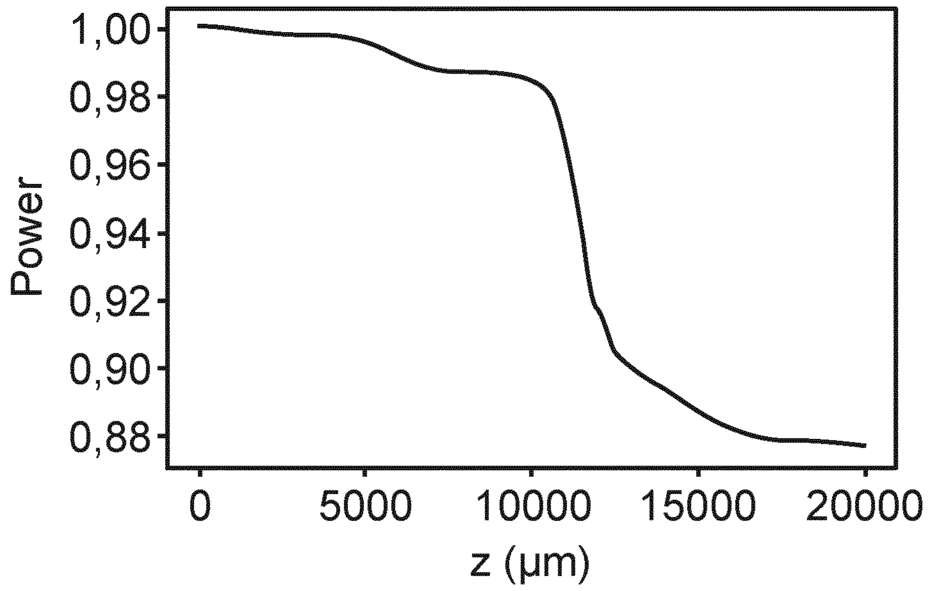
FIG. 6: Curve showing the efficiency of light coupling with respect to the second simulation.
Figure 7:
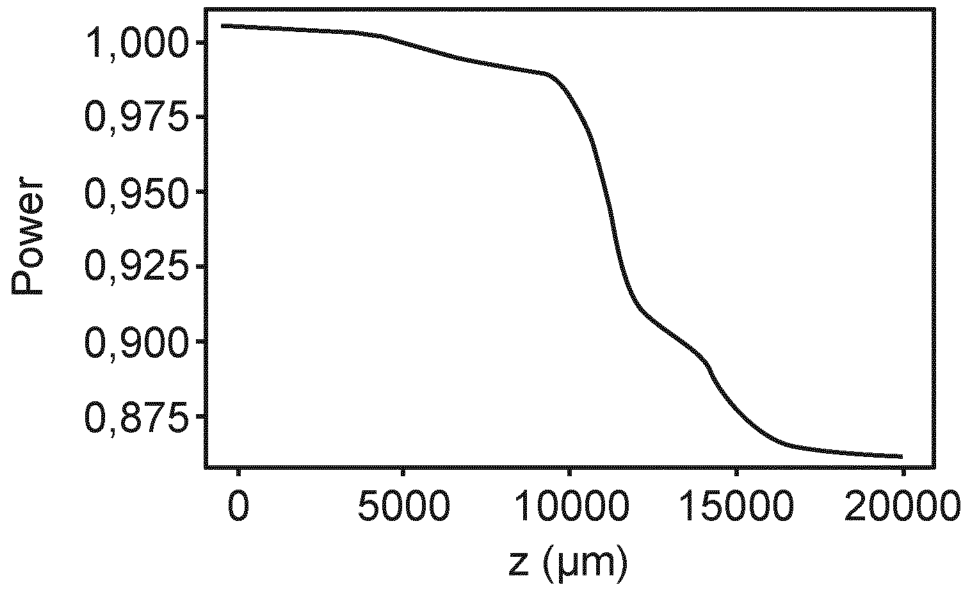
FIG. 7: Curve showing the efficiency of light coupling with respect to the third simulation.

In addition to FIGS. 4 and 5, FIGS. 6 and 7 show the light transmission efficiency along the propagating path of the light through an apparatus 1, respectively a photonic lantern 2 according to the invention. FIG. 6 shows the efficiency of the light coupling in case the incoming light is distributed over the input waveguide 3 as shown FIG. 4 a) and FIG. 7 shows the efficiency of the light coupling in case the incoming light is distributed over the input waveguide 3 as shown FIG. 5 a). It clearly can be seen, that the efficiency of the light coupling realized by the photonic lantern 2 according to the invention, hence the ratio of luminous intensity in the output waveguide 4 to the luminous intensity in the input waveguide 3 is between 0.88, in FIG. 6 and 0.87 in FIG. 7. The results show, that using an apparatus 1, respectively a photonic lantern 2 according to the invention a very efficient light coupling between multiple multi-mode fibres 7 and a single multi-mode fibre 8, whereby light coupling can take place in either direction, can be realized.

LIST OF REFERENCE NUMERALS

- 1 apparatus connecting several multi-mode fibres with a single multi-mode fibre
- 2 photonic lantern
- 3 input waveguide
- 4 output waveguide
- 5 input side
- 6 output side
- 7 multi-mode fibre of the input waveguide
- 8 single multi-mode fibre of the input waveguide
- 9 core of a multi-mode fibre of the input waveguide
- 10 core of the single multi-mode fibre of the input waveguide
- 11 claddings of a multi-mode fibre of the input waveguide
- 12 capillary
- 13 close packing arrangement

The invention claimed is:

1. An apparatus for guiding light from an input side to an output side, the apparatus comprising an input waveguide at the input side formed by at least two multi-mode fibres, an output waveguide at the output side formed by a single multi-mode fibre, a photonic lantern optically connecting the at least two multi-mode fibres of the input waveguide to the single multi-mode fibre of the output waveguide, said photonic lantern being configured such that, light transmitted by light guiding cores of the at least two multi-mode fibres of the input waveguide is coupled into a light guiding core of the single multi-mode fibre of the output waveguide and propagates through the light guiding core of the single multi-mode fibre of the output waveguide and that claddings surrounding the light guiding cores of the at least two multi-mode fibres of the input waveguide are tapered down until they do at least almost not confine light, and a capillary, wherein the at least two multi-mode fibers of the input waveguide are located inside the capillary and the capillary forms the cladding of the single multi-mode fiber of the output waveguide.

2. The apparatus according to claim 1, wherein the capillary comprises fluorine doped silica glass.

3. The apparatus according to claim 1, wherein the multi-mode fibres of the input waveguide are arranged in a close packed arrangement in relation to a cross-sectional plane of the input waveguide.

4. The apparatus according to claim 1, wherein a ratio of a diameter of the light guiding core of at least one of the multi-mode fibres of the input waveguide to its cladding is between 1.05 and 1.15, preferably 1.1.

5. The apparatus according to claim 1, wherein the input waveguide comprises 58 to 62 multi-mode fibres.

6. The apparatus according to claim 1, wherein the photonic lantern is configured such that a diameter of the light guiding core of at least one of the multi-mode fibres of the input waveguide tapers down by 94.5 to 95.5%.

7. The apparatus according to claim 1, wherein the light guiding core of at least one multi-mode fibre of the input waveguide and/or the light guiding core of the single multi-mode fibre of the output waveguide comprise pure silica.

8. The apparatus according to claim 1, wherein the refractive index of the light guiding core of at least one multi-mode fibre of the input waveguide and/or the refractive index of the single multi-mode fibre of the output waveguide is 1.440 to 1.448, at a wavelength within a range of 1450 to 1650 nm.

9. The apparatus according to claim 1, wherein the refractive index of the capillary is 1.425 to 1.430, preferably 1.428 at a wavelength within a range of 1450 to 1650 nm, in particular at a wavelength of approximately or accurately 1550 nm.

10. A method for producing a photonic lantern suitable for an apparatus for guiding light from an input side to an output side, the method comprising the steps of:

providing at least two multi-mode fibres comprising a light guiding core and a cladding surrounding the light guiding core, stacking the at least two multi-mode fibres inside a capillary, heating and drawing the capillary together with the multi-mode fibres in such a way, (a) that the light guiding cores of the at least two multi-mode fibres become a light guiding core of a single multi-mode fibre, at which the capillary building the cladding of said single multi-mode fibre and (b) that claddings surrounding the light guiding cores of the at least two multi-mode fibres when stacked inside the capillary are tapered down until they do at least almost not confine light, wherein the at least two multiple multi-mode fibres, comprising a light guiding core and a cladding surrounding the light guiding core, are stacked together in a close packed arrangement inside the capillary.

11. Method according to claim 10, wherein the diameter of the light guiding cores of the at least two multi-mode fibres are tapered down in such a way that a resulting diameter is 4.5 to 4.6% of the diameter before tapering.

12. Use of an apparatus according to claim 1 for coupling light from multiple telescopes into a single spectrograph, for medical endoscopy and/or for guiding light from multiples laser sources to a laser cutting tool.

13. Use of a photonic lantern produced according to claim 10 for coupling light from multiple telescopes into a single spectrograph, for medical endoscopy and/or for guiding light from multiples laser sources to a laser cutting tool.

14. An apparatus configured to guide light from an input side to an output side, the apparatus comprising:

an input waveguide at the input side, the input waveguide comprising two or more multi-mode fibres with a ratio of a diameter of a light guiding core to a surrounding cladding that is between 1.05 and 1.15;

an output waveguide at the output side, the output waveguide comprising a single multi-mode fibre;

a photonic lantern optically connecting the at least two multi-mode fibres of the input waveguide to the single multi-mode fibre of the output waveguide, wherein the photonic lantern is configured such that the claddings surrounding the light guiding cores of the two or more multi-mode fibres of the input waveguide are tapered down so as to at least almost not confine light such that, light transmitted by light guiding cores of the two or more multi-mode fibres of the input waveguide is coupled into a light guiding core of the single multi-mode fibre of the output waveguide and propagates through the light guiding core of the single multi-mode fibre of the output waveguide; and a capillary, wherein the two or more multi-mode fibers of the input waveguide extend into the capillary and the capillary forms a cladding of the single multi-mode fiber of the output waveguide.

15. The apparatus according to claim 14, wherein the capillary comprises fluorine doped silica glass.

16. The apparatus according to claim 14, wherein the multi-mode fibres of the input waveguide are arranged in a close packed arrangement in relation to a cross-sectional plane of the input waveguide and wherein the input waveguide comprises 58 to 62 multi-mode fibres.

17. The apparatus according to claim 14, wherein the photonic lantern is configured such that a diameter of the light guiding core of one or more of the multi-mode fibres of the input waveguide tapers down by 94.5 to 95.5%.

18. The apparatus according to claim 1, wherein the light guiding core of one or more multi-mode fibre of the input waveguide and/or the light guiding core of the single multi-mode fibre of the output waveguide comprise pure silica.

19. The apparatus according to claim 1, wherein a refractive index of the light guiding core of one or more multi-mode fibre of the input waveguide and/or a refractive index of the single multi-mode fibre of the output waveguide is 1.440 to 1.448, at a wavelength within a range of 1450 to 1650 nm.

20. The apparatus Apparatus according to claim 14, wherein the refractive index of the capillary is 1.425 to 1.430 at a wavelength within a range of 1450 to 1650 nm.

* * * * *